July 2, 1935.  W. R. DUCKETT  2,007,042
CHEWING GUM RECEIVER
Filed Aug. 5, 1933  2 Sheets-Sheet 1
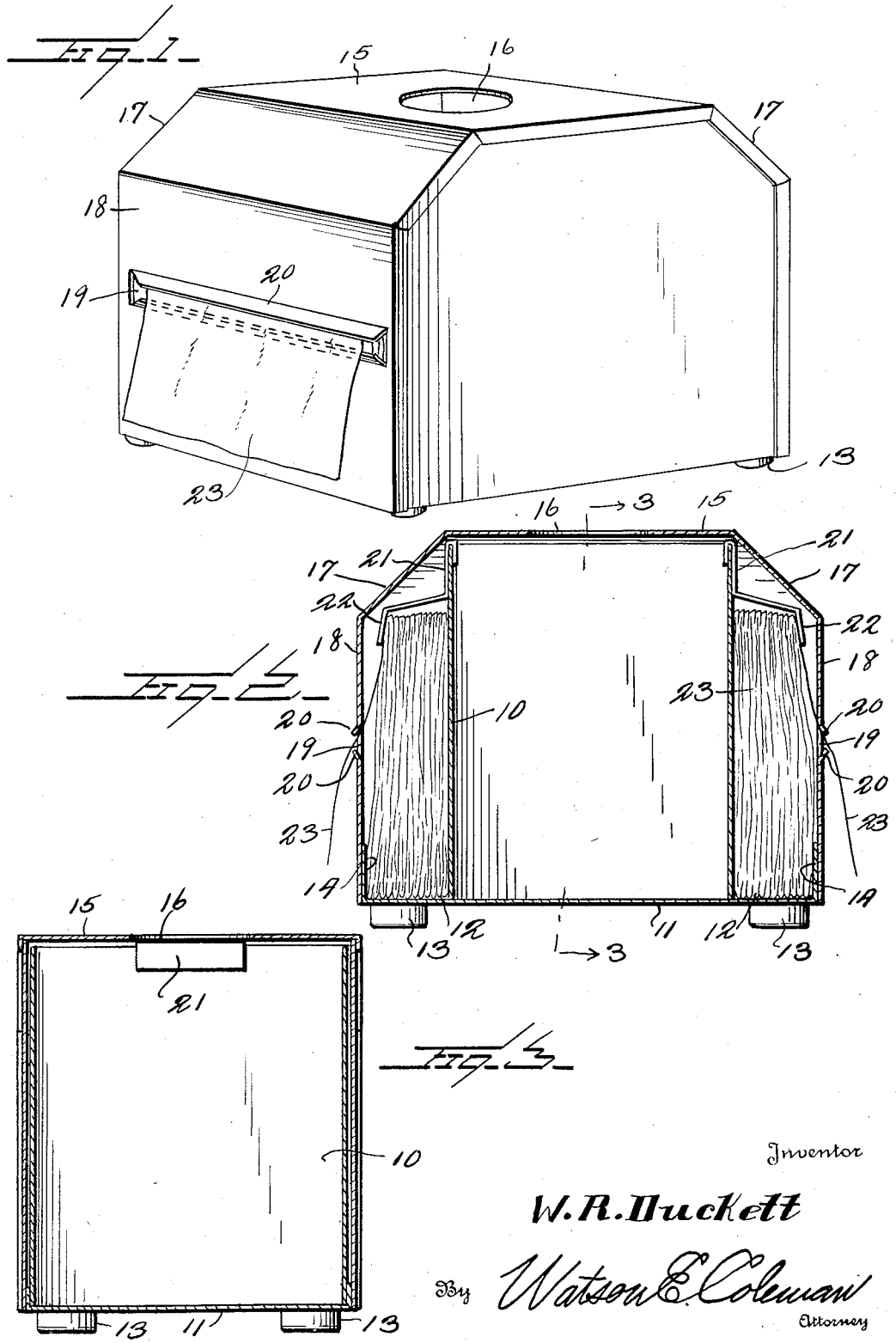

July 2, 1935.  W. R. DUCKETT  2,007,042
CHEWING GUM RECEIVER
Filed Aug. 5, 1933  2 Sheets-Sheet 2
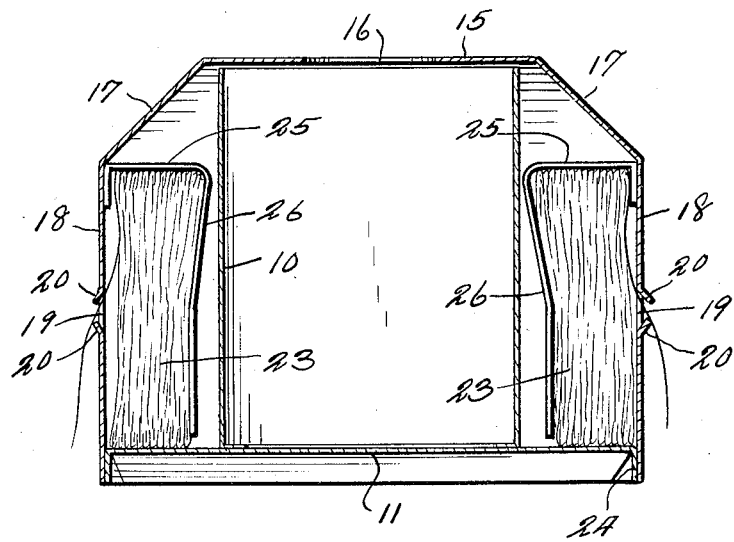
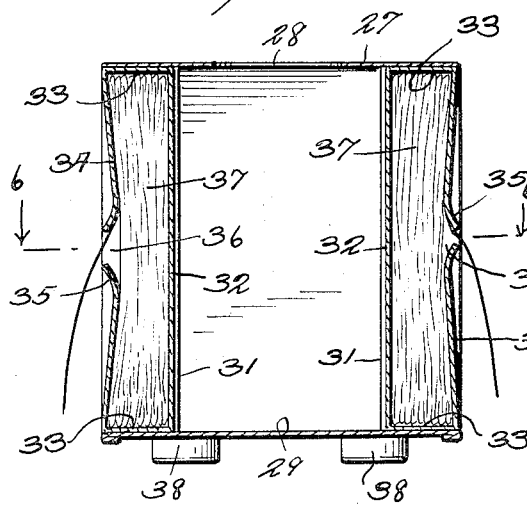
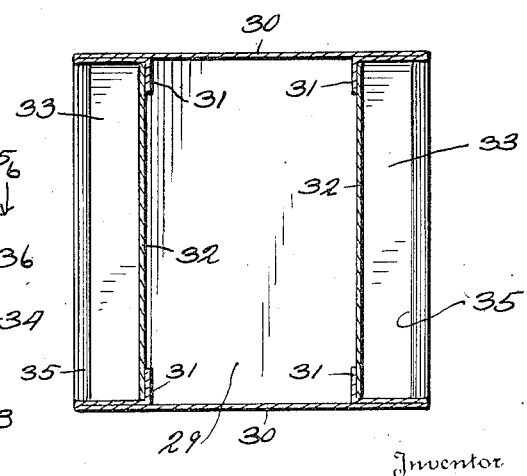
Inventor
W. R. Duckett
By Watson E. Coleman
Attorney Patented July 2, 1935

2,007,042

UNITED STATES PATENT OFFICE 2,007,042

CHEWING GUM RECEIVER

Willie R. Duckett, Franklin, Nebr.

Application August 5, 1933, Serial No. 683,823

6 Claims. (Cl. 206—1)

This invention relates to waste receptacles and particularly to a device for receiving chewing gum.

One of the great nuisances of gum chewing is due to the fact that the person chewing the gum having no place to deposit it is very liable to throw the chewed gum on the floor or stick it under the edge of a chair seat or otherwise dispose of it in some such manner. Thereafter, those walking across the floor are liable to get the gum on their shoes or those sitting down in the chair seat are very liable to have it attach itself to their garments and the garments have to be very thoroughly cleaned in order to get the gum out. Oftentimes, the garment is injured or ruined.

The object of this invention, therefore, is to provide a gum receiver for use in booths, hotel rooms, dining rooms, theaters and other places where chewing gum is a nuisance and creates unsanitary conditions, and to provide a device which will eliminate the present practice of placing chewing gum from the mouth on the under sides of tables, counters and chairs, or dropping it on the floor where it is forced into the carpet or rugs and can only be cleaned therefrom at considerable expense.

A further object is to provide a device of this character which includes a receptacle for the gum and holder disposed on the side of the receptacle and adapted to dispense small paper napkins in which the used gum may be deposited and wrapped and then the gum and its wrapping dropped into the central receptacle.

A still further object is to provide a device of this character which is simple, attractive and which may be readily manufactured in a large number of different styles to be used under different situations.

My invention is illustrated in the accompanying drawings wherein:—

Figure 1 is a perspective view of one form of my invention;

Figure 2 is a vertical sectional view of the structure shown in Figure 1;

Figure 3 is a section on the line 3—3 of Figure 2;

Figure 4 is a vertical section like Figure 2 showing a modified form of the receptacle;

Figure 5 is a longitudinal vertical section of another form of the device; and

Figure 6 is a horizontal section on the line 6—6 of Figure 5 omitting the paper napkins.

Referring to the structure shown in Figures 1, 2 and 3, 10 designates an inner gum receptacle which is illustrated as square in cross section and which may have any desired height. This receptacle rests upon a base plate 11 which extends out laterally beyond the receptacle on opposite sides, as at 12. Feet 13, which may be of rubber, are attached to the base plate of the receptacle. Adapted to be disposed over the inner receptacle 10 and extend down around the flanges 14 of the base plate 11 is a cover or casing designated generally 15. This has a flat top provided with a central opening 16 and on each side of the flat top, the cover extends downward and outward, as at 17, and then straight downward. This cover may be made of a plurality of pieces drawn together by solder or otherwise, and I do not wish to be limited to any particular construction for the cover. The cover midway of the opposed vertical portions 18 is formed with the slits 19 which are defined by the outwardly convergent lips 20, as shown most clearly in Figure 2. Attached to the receptacle 10 at the upper edges thereof on opposite sides are the clips 21 which extend downward along the wall of the receptacle, then outward and then downward, as at 22. Interfolded paper napkins designated generally 23 are disposed within the spaces between the inner receptacle and the outer receptacle and are held in place by the clips 21, these napkins being so interfolded that the pulling out of one napkin pulls out the margin or end of the next succeeding napkin. This is a common way of dispensing folded paper as for instance cigarette paper, toilet paper and the like, so that there is no necessity of describing the particular folds given to the paper in order to permit this operation to be accomplished. This device permits a napkin 23 to be so disposed that one margin of the napkin projects outward and may be readily grasped to pull the napkin entirely out of the casing. This pulling of one napkin out of the casing will pull the margin of the next succeeding napkin out of the casing. The user pulls out the napkin, places the used gum within it and places the wrapped gum through the opening 16 into the receptacle 10.

It will be noted that the flanges 14 extend upward and bear against the lower edge of the folded paper 23 so that these flanges 14 constitute clips with the clips 21 holding the folded napkins in place. These flanges 14 also have frictional engagement with the opposed walls of the casing 15.

When it is desired to remove the waste gum from the interior of the receptacle, the outer casing is forced upward relative to the inner receptacle which may be accomplished by inserting any implement such as a pencil or the like through the opening 16 and forcing the bottom away from the top or by taking hold of the feet 13 and the cover and pulling them apart.

In Figure 4, I show a variant form of my invention which is constructed precisely like the construction shown in Figures 1 and 2 except for one thing, that the base plate 11 has downwardly extending flanges 24 instead of having the upwardly extending flanges 14, these downwardly extending flanges acting as feet and extending entirely around the base plate and except for the fact that instead of having the paper 23 gripped by the clips 21 and the flanges 14, a single clip 24 is used which is attached at its upper end to the upper end of the vertical portion 18 of the outer casing, then extends directly rearward and then downward and inward and then approximately straight downward so that the portion 26 bears against the entire back of the folded napkins 23. This casing is also opened in the same manner as described for Figures 1 and 2, that is, the cover is withdrawn from the base. This permits the waste paper and gum to be readily discharged and permits the folded napkins to be replaced within the clip. Inasmuch as the construction shown in Figure 4 is very like that shown in Figures 1 and 2, the same numerals have been used for the same parts.

In Figures 5 and 6, there is shown another variant form of my invention which is to some extent simpler and more compact than the structures shown in Figures 1 and 2. In this construction, there is provided an outer casing 27 rectangular in form and having a top provided with a central opening 28. The floor 29 of this casing is connected to the top by oppositely disposed end walls 30. These end walls are formed with the inwardly extending flanges 31 which are disposed inward of the outer edges of these end walls as shown best in Figure 6. These flanges define side compartments, as they may be called, within which packets of paper may be placed. These packets are disposed within packet holders, each holder comprising a back plate 32 which is extended outward at its upper and lower ends as at 33, and then upward and inward, as at 34, these outer portions 34 at their margins being outwardly bent as at 35, and defining a slit 36 through which the margin of the first napkin of the series of napkins 37 is projected. These napkin holders are frictionally engaged with the walls 30 and when in place bear against the flanges 31, as shown in Figure 6. The napkin holders are open at their ends, as shown in Figure 6. Feet 38 are attached to the bottom of the outer casing in a manner previously described, these feet being preferably of rubber or lighter material so as to prevent the feet scratching on a polished surface.

The device shown in Figures 5 and 6 is to be used in exactly the same way as that shown in Figures 1 and 2, and the only difference is that in the structure shown in Figures 5 and 6, the waste paper with the used gum may be discharged from the inner receptacle by forcing outward on one or the other or both of the packet holders. When the holders are forced outward, they may be readily filled with the packets or interfolded paper. It is to be particularly understood that in the structure shown in Figure 5, I do not wish to be limited to the use of two packets, one on each side of the casing, but that only one packet holder need be used, the opposite side of the outer casing being closed by a plain wall.

While I have illustrated certain details of construction which I have found to be particularly good for gum receptacles designed to be placed on a table, mantlepiece or in like situations, I do not wish to be limited to this construction as it is obvious that these gum receptacles may be very greatly modified to suit various situations and for instance may be made of such form that they may be readily applied to the backs of theater chairs so the gum chewer may have a receptacle conveniently placed wherein to deposit the used gum. By providing a napkin holder, each piece of gum will be wrapped in a paper napkin and thus may be readily discharged from the receptacle whereas if the gum itself unwrapped were placed in the receptacle, it would be liable to stick to the bottom or side walls of the receptacle and the receptacle would require constant cleaning. Where the gum is wrapped in paper, however, it will not come in contact with the walls of the receptacle and may, therefore, be readily discharged.

It will be seen that in all my structures, there is provided a compartment which constitutes a receptacle for used chewing gum and a compartment sustaining a packet of interfolded sheets or napkins, this compartment having a slit through which the napkins may be individually dispensed or withdrawn. It is, of course, to be understood that by the term "napkins" I refer to relatively small sheets of tissue paper or like material having a size large enough to permit an ordinary lump of chewed gum to be wrapped therein.

Having described my invention, what is claimed is:—

1. A receiver for used chewing gum forming two sections, the sections being detachably engaged with each other, the receiver having an opening for the reception of the chewed gum, the chewed gum being removable from the receiver by detaching the two sections, one wall of the receiver being formed to provide a napkin holder adapted to hold a packet of interfolded napkins and having the slit through which said napkins may be withdrawn.

2. A receiver for used chewing gum comprising a receptacle having a top, bottom and sides, the top having an opening through which the gum may be inserted, one of the side walls of the receptacle being removable from the receptacle and being formed to provide a holder for a packet of paper napkins, said holder having a slit through which the napkins are dispensed one by one.

3. A receiver for used chewing gum comprising a receptacle having an opening in its top, the receptacle being open in one side, and a napkin holder adapted to fit in the open side wall of the receptacle and comprising a back plate and downwardly and inwardly extending front portions defining between them a slit through which the napkins may be dispensed, the receptacle having flanges extending inwardly and constituting stops limiting inward movement of the napkin holder.

4. A receiver for used chewing gum, comprising a base, a receptacle extending upward from the base and rectangular in cross section and open at its upper end, the base extending out beyond the receptacle at opposite sides, an outer casing adapted to fit over and enclose the receptacle and having an opening in its top, the casing at its lower end frictionally engaging the base, the outer casing having a slitted wall spaced from the adjacent wall of the receptacle to provide a napkin holding compartment to permit the discharge of the napkins.

5. A receiver for used chewing gum having a base, a receptacle rectangular in cross section and extending upward from the base, the base extending beyond the receptacle in one dimension, but being continuous with the opposed walls of the receptacle in another dimension, and an outer casing fitting over and enclosing the receptacle, the outer casing being rectangular in cross section and frictionally engaging the base, the opposite walls of the casing fitting against the side walls of the receptacle, one of the other walls of the casing being spaced from the adjacent wall of the receptacle to form a space for folded paper napkins, this wall being slotted to permit the removal of the napkins.

6. A receiver for used chewing gum formed to provide a cubicle chewing gum compartment and a rectangular napkin containing compartment, the inner wall of the napkin compartment forming one wall of the cubicle gum compartment, the outer wall of the napkin compartment having a slit through which napkins may be dispensed one by one, the napkin compartment having resilient means holding the napkins in place therein, the top wall of the gum compartment having an opening less in area than the cross sectional area of the gum compartment through which the gum may be inserted, the receiver being separable to permit the emptying of the gum compartment and the refilling of the napkin compartment.

WILLIE R. DUCKETT.